United States Patent [19]
Chan et al.

[11] Patent Number: 6,108,654
[45] Date of Patent: Aug. 22, 2000

[54] METHOD AND SYSTEM FOR LOCKING RESOURCES IN A COMPUTER SYSTEM

[75] Inventors: Wilson Wai Shun Chan, San Mateo; Tak Fung Wang, Hayward, both of Calif.

[73] Assignee: Oracle Corporation, Redwood Shores, Calif.

[21] Appl. No.: 08/961,797

[22] Filed: Oct. 31, 1997

[51] Int. Cl.$^7$ .................................................. G06F 12/00
[52] U.S. Cl. ............................................... 707/8; 710/200
[58] Field of Search ............................ 395/726; 707/201, 707/202, 8; 710/200

[56] References Cited

U.S. PATENT DOCUMENTS

| | | | |
|---|---|---|---|
| 5,301,357 | 4/1994 | Thompson | 395/800 |
| 5,499,367 | 3/1996 | Bamford et al. | 395/600 |
| 5,623,659 | 4/1997 | Shi et al. | 395/608 |
| 5,682,537 | 10/1997 | Davies et al. | 395/726 |
| 5,761,660 | 6/1998 | Josten et al. | 707/8 |
| 5,765,151 | 6/1998 | Senator | 707/8 |
| 5,832,484 | 11/1998 | Sankaran et al. | 707/8 |
| 5,832,517 | 11/1998 | Knutsen, II | 707/202 |
| 5,864,849 | 1/1999 | Bohannon et al. | 707/8 |
| 5,920,872 | 7/1999 | Grewell et al. | 707/202 |

*Primary Examiner*—Paul V. Kulik
*Attorney, Agent, or Firm*—McDermott, Will & Emery

[57] ABSTRACT

Methods and systems are provided for providing locking in a system. The resource objects of the system can be persistent, and thus provide finer granularity locking by allowing shared resource objects to be dynamically allocated and de-allocated. The persistent nature of the resource objects allows for the dynamic allocation and de-allocation of the resource objects, while guarding against the abnormal release of resource locks that result in the possibility of inconsistent data. If abnormal release occurs, the affected resource object(s) are marked to indicate that they are in a "dubious" state. The dubious resource objects are not dynamically de-allocated, but are instead allowed to persist until corrective or validation actions are taken. If the locks are validly released, then the resource objects can be safely de-allocated. In this manner, fine granularity locks can be created to cover minute portions of the shared system resources for some duration, without excessively incurring system overhead and memory.

41 Claims, 6 Drawing Sheets

METHOD AND SYSTEM FOR LOCKING RESOURCES IN A COMPUTER SYSTEM

FIELD OF THE INVENTION

The present invention pertains to computer systems, and more particularly, to locking mechanisms used in computer systems.

BACKGROUND OF THE INVENTION

In computer systems that are capable of running multiple processes concurrently, the possibility exists for resources in the system to be accessed by more than one process at the same time. If not controlled, multiple concurrent accesses to the same resource may compromise the integrity of that resource. As used herein, the term "resource" refers to any object that can be accessed in the system. Examples of resources are files, shared memory regions, database tables or memory blocks.

To illustrate the possible problems inherent with concurrent access to shared resources, consider a multi-process database system. Process 1 begins a transaction that writes a value A to a data object, but prior to the completion of the entire transaction by Process 1, Process 2 performs a read on that data object. Process 1 then performs a further write that places a value B into the data object, and thereafter completes ("commits") the transaction. In this situation, the final version of the data object actually contains value B, not the value A read by Process 2. However, because Process 2 was allowed to read the data object before Process 1 had completed its writes, Process 2 erroneously believes that the data object contains value A. This "dirty read" has introduced a inconsistency into the system with respect to the value of the concurrently accessed object, thereby compromising the integrity of the data on the system.

To address situations such as this, various mechanisms are available to ensure the integrity of objects accessed by multiple processes. In particular, many database management systems (DBMS) utilize locking mechanisms to manage and coordinate access to shared objects on the system. In such systems, each process may be required to obtain a lock on an object before accessing an object. The type and parameters of the lock determine the scope of the access rights granted to the obtaining process. The appropriate grant of locks to objects ensures compatible access to the objects by concurrent processes.

To correct the dirty read example illustrated above, Process 1 may employ such a locking mechanism to exclusively lock the data object prior to making any writes. By doing so, Process 2 is blocked from accessing the same data object during the duration of Process 1's activities. Once Process 1 completes its work, the lock on the data object is released and Process 2 can thereafter access the final version of the data object, preventing the dirty read described above.

When implementing a locking mechanism, the granularity of the locks has an effect upon the performance of the system. As a general rule, the smaller the unit of resource covered by each individual lock, the less likely that the system will experience "false conflicts." A false conflict may occur, for example, when a first process holds a lock on an entire database table in order to update only row A of the table, while a second process seeks to concurrently update row B of the same table. Although the first process is only interested in updating row A, it has locked the entire table, thus preventing any other processes from updating other rows in the table. Hence, the second process would be blocked from performing its modification to row B. This type of false conflicts can dramatically reduce the efficiency and concurrency of the overall system, and could be prevented by forcing the first process to obtain a much finer lock covering only the specific row it seeks to modify. Consequently, many multi-tasking systems favor finer-grain locking over coarser grain locking to minimize false conflicts.

However, in many systems, there are only a finite number of locks available. Each open lock consumes a given amount of system memory and resources, and because of limited system resources, there is typically a practical limit to the number of locks that can be active at any one time. In such systems, maintaining an increased number of concurrently open finer-grained locks may not be feasible because of the increased system and memory requirements. Thus, coarser locks are necessarily employed, resulting in an increased risk of false conflicts.

This problem may occur, for example, in a distributed system where multiple distributed nodes concurrently access shared resources across the network. In many systems, if a process abnormally terminates while holding a lock on a resource, the lock is automatically de-allocated by the system. If the dead process made uncommitted changes while holding the lock, then the absence of an open lock on the resource (i.e., because of abnormal process death) may allow other processes to access an invalid resource value, introducing data inconsistencies into the system. Thus, the system should possess a mechanism to protect such data inconsistencies, by allowing other nodes and processes in the distributed system to recognize and identify shared resources that may be in an inconsistent state because of abnormal process termination.

One approach to address this problem is to employ a distributed lock manager to statically map and allocate open locks to cover all system objects at node startup time. The key to this approach is that each node opens a lock on all shared resources during node startup, and these locks do not release until node shutdown. In such a system, each of the distributed nodes hold locks on all the resources, and will notice and react to state changes when attempts are made to access a lock that is in abnormal state because of a node or process death. In this manner, the distributed system is protected from processes or nodes that abnormally die while holding locks on system resources.

The problem is that it is normally impractical to employ fine-granularity locking under this approach. If fine-granularity locks are employed, then a large number of locks are actively maintained at all times, resulting in the prohibitively increased consumption of system resources and memory. Thus, the scope of each lock is typically made relatively coarse to reduce the overall number of locks that must be maintained. However, the use of coarse-granularity locks increases the occurrence of false conflicts, leading to greater contention over shared system resources.

Therefore, there is a need for a system and method for locking in a computer system which allow fine-granularity locking, while protecting against data inconsistencies resulting from abnormal lock termination. There is further a need for a system and method for locking in a distributed system which allow fine-granularity locking while providing efficient handling of abnormal node and process deaths.

SUMMARY OF THE INVENTION

A method and system provides finer-grained dynamic allocation and de-allocation of locks in a system, while protecting against abnormal termination that may result in data integrity problems. The resource objects of the present invention can be persistent, and if abnormal release occurs, the affected resource object(s) are marked to indicate the possibility of data inconsistency problems. The dubious resource objects are not dynamically de-allocated, but are instead allowed to persist until corrective or validation actions are taken. If the lock release does not result in the possibility of data inconsistency problems, then the resource objects can be safely de-allocated.

Additional objects, advantages, and novel features of the invention are set forth or will become apparent to those skilled in the art from the following detailed description and the accompanying drawings.

BRIEF DESCRIPTION OF THE DRAWINGS

The present invention is illustrated by way of example, and not by way of limitation, in the drawings of the present invention.

DETAILED DESCRIPTION OF THE PREFERRED EMBODIMENT

The present invention comprises a method and mechanism for providing lock management in a distributed database system. In the following detailed description, numerous specific details are set forth to provide a thorough understanding of the invention. However, it will be apparent to one skilled in the art that these specific details need not be used to practice the invention. In other instances, well-known structures, interfaces, and processes have not been shown in detail in order not to unnecessarily obscure the invention.

OPERATIONAL OVERVIEW

The resource objects of the present invention are persistent, and thus provide finer granularity locking by allowing shared resource objects to be dynamically allocated and de-allocated, while also guarding against the abnormal release of resource locks that result in the possibility of inconsistent data. If abnormal release occurs, the affected resource is object(s) are marked to indicate that the associated resource may be in an inconsistent state, e.g., the resource is marked to indicate that that state of the resource object is "dubious." The dubious resource objects are not dynamically de-allocated, but are instead allowed to persist until action is taken to correct or validate the state of the resource. However, if the locks are validly released, then the resource objects can be safely de-allocated. In this manner, fine granularity locks can be created to cover minute portions of the shared system resources for some duration without excessively incurring system overhead and memory, while also protecting against abnormal lock release, e.g., by process or node failure.

HARDWARE OVERVIEW

Figure 1:
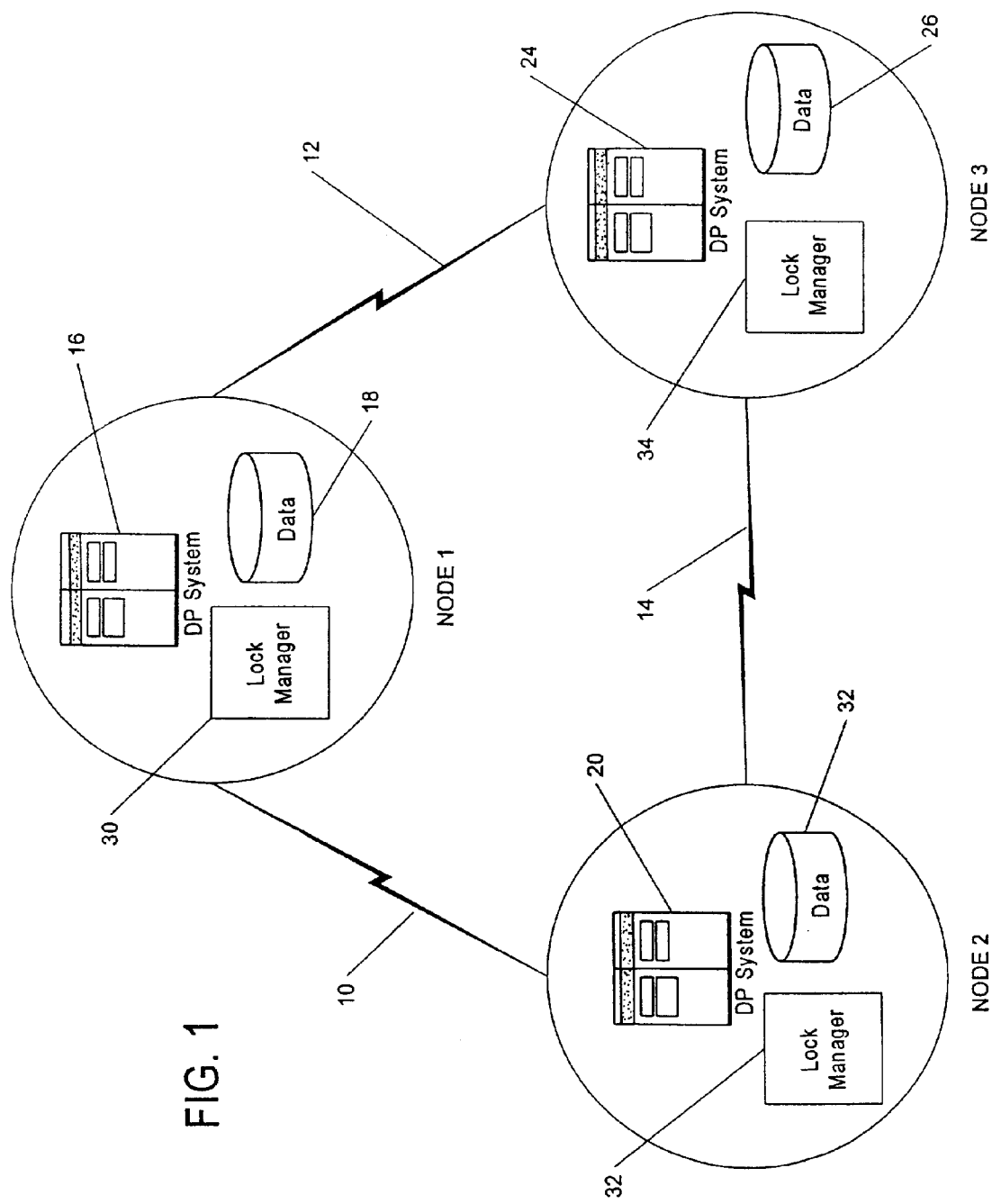
FIG. 1 illustrates an embodiment of a distributed processing system.

FIG. 1 illustrates a distributed data processing system 4 comprising node 1, node 2, and node 3, coupled together with network links 10, 12, and 14. It will be apparent to one skilled in the art that an arbitrary number of nodes may be supported in a distributed data processing system 4. Each node, such as node 1, comprises a data processing system 16 and a data store 18. Each node may comprise objects or resources that are accessed and shared with any of the other nodes. Thus, although data store 18 resides on node 1, data store 18 may be a shared resource accessible by data processing systems 20 and 24 on nodes 2 and 3, respectively.

Figure 2:
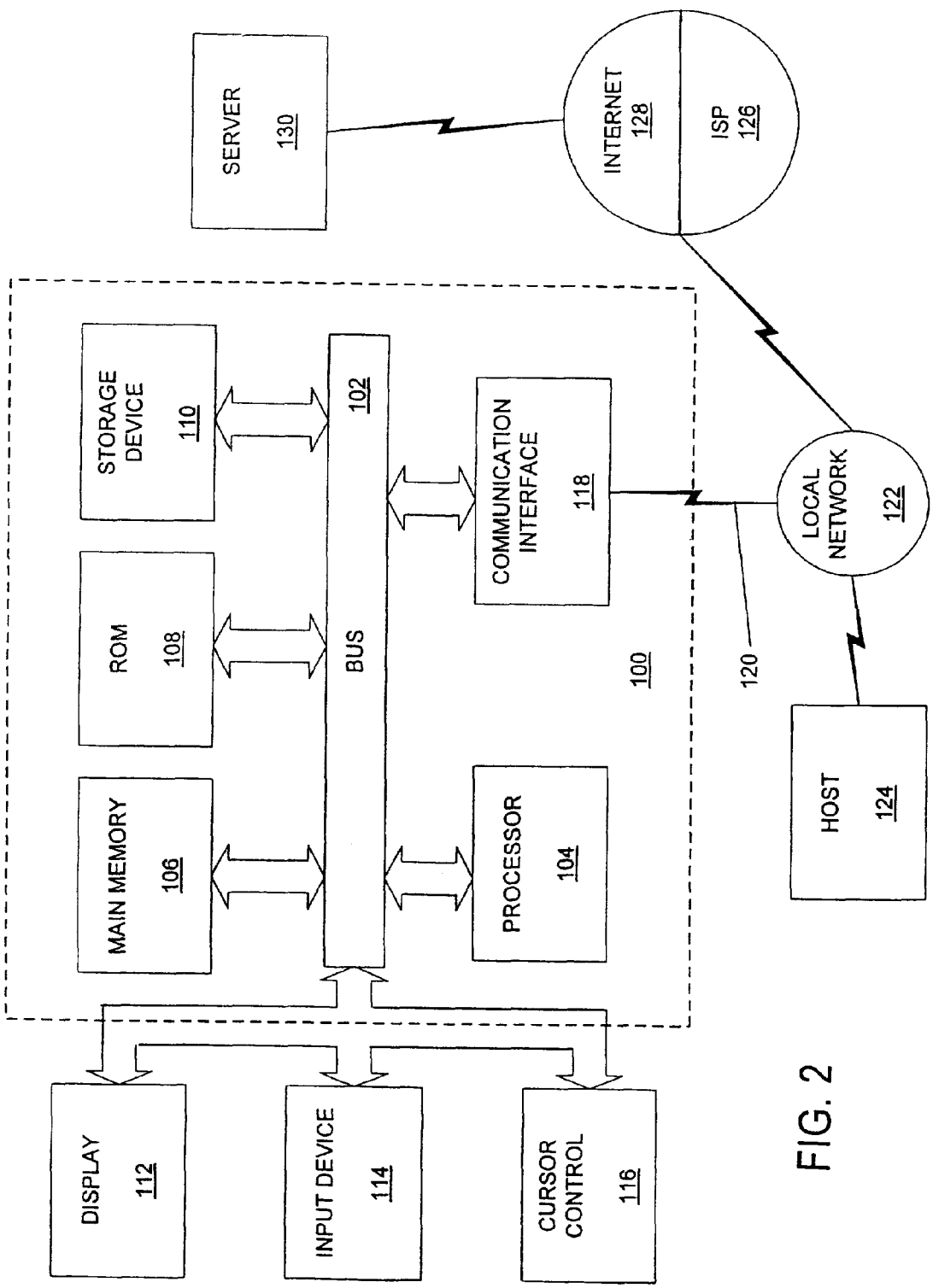
FIG. 2 illustrates an embodiment of an architecture of a computer system within a distributed processing system.

FIG. 2 is a block diagram of an embodiment of a computer system 100 upon which an embodiment of the present invention can be implemented. Each node of the distributed processing system 4 may comprise a computer system 100. Computer system 100 includes a bus 102 or other communication mechanism for communicating information, and a processor 104 coupled with bus 102 for processing information. Computer system 100 also includes main memory 106, such as random access memory (RAM) or other dynamic storage device, coupled to bus 102 for storing information and instructions to be executed by processor 104. Main memory 106 also may be used for storing temporary variables or other intermediate information during execution of instructions by processor 104. Computer system 100 further includes a read only memory (ROM) 108 and/or other static storage devices coupled to bus 102 for storing static information and instructions for processor 102. A data storage device 110, such as magnetic disk or optical disk, is coupled to bus 102 for storing information and instructions.

Computer system 100 may be coupled via bus 102 to display 112, such as a cathode ray tube (CRT), for displaying information to a computer user. An input device 114, including alphanumeric and other keys, is coupled to bus 102 for communicating information and command selections to processor 104. Another possible type of user input device is cursor control 116, such as a mouse, trackball, or cursor direction keys for communicating direction information and command selections to processor 104 and for controlling cursor movement on display 112. This input device typically has at least two degrees of freedom in two axes, a first axis (e.g., x) and a second axis (e.g., y), that allows the device to specify positions in a plane.

The invention is related to the use of computer system 100 to manage and control the locking of system resources. According to one embodiment of the invention, the management of locks is performed by computer system 100 in response to processor 104 executing one or more sequences of instructions contained in main memory 106. Such instructions may be read into main memory 106 from another computer-readable medium, such as data storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the present invention are not limited to any specific combination of hardware circuitry and software.

The term "computer readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of electromagnetic, acoustic or light waves, such as those generated during radio-wave and infra-red communications.

Common forms of computer readable media include, for example, a floppy disk, a flexible disk, hard disk, magnetic tape, any other magnetic medium, a CD-ROM, any other optical medium, punchcards, papertape, any other physical medium with computer readable patterns, a RAM, a PROM, a FLASH-PROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line and use an infra-red transmitter to convert the data to an infra-red signal. An infra-red detector coupled to bus 102 can receive the data carried in the infra-red signal and place the data on bus 102. Bus 102 carries the data to main memory 106, from which processor 104 retrieves and executes the instructions. The instructions received by main memory 106 may be optionally stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or modem to provide data communication connection to a corresponding type of telephone line. As an another example, communication interface 118 may be a local area network (LAN) card to provide a data communication connection to a compatible LAN. Wireless links may also be implemented. In any such implementation, communication interface 118 sends and receives electrical, electromagnetic or optical signals that carry data streams representing various types of information.

Network link 120 typically provides data communication through one or more networks to other data devices. For example, network link 120 may provide a connection through local network 122 to a host computer 124 or to data equipment operated by an Internet Service Provide (ISP) 126. ISP 126 in turn provides data communications services throughout the world wide packet data communications network now commonly referred to as the "Internet" 128. Local network 122 and Internet 128 both use electrical, electromagnetic or optical signals that carry data streams. The signals through the various networks and the signals on network link 120 and through communication interface 118, which carry data to and from computer system 100, are exemplary forms of carrier waves transporting the information.

Computer system 100 can send and receive data, including program code, through network(s), network link 120, and communication link 118. In the Internet example, a server 130 might transmit a requested code for an application program through Internet 128, ISP 126, local network 122, and/or communication interface 118. In accordance with the invention, one such downloaded application provides for the generation of lock objects and lock managers as described herein. The received code may be executed by processor 104 as it is received, and/or stored in storage device 110, or other non-volatile storage for later execution. In this manner, computer system 100 may obtain application code in the form of a carrier wave.

LOCK MANAGER

A lock manager is a mechanism that manages and controls the allocation of locks in a system. The lock manager maintains a set of resource names and provides operations for allowing multiple processes to synchronize the concurrent access of named resources. In a distributed system, each node in the distributed system may have its own instantiation of a distributed lock manager. In the distributed system illustrated in FIG. 1, node 1 comprises a distributed lock manager instance 30, node 2 comprises a distributed lock manager instance 32, and node 3 comprises a distributed lock manager instance 34.

If a process seeks to access a resource, it sends a lock request to the lock manager. When the lock manager grants a lock to the process, the lock manager holds the lock for that process until the process indicates that the lock is no longer needed, at which time the lock can be validly released by the lock manager. Each lock granted to a process is typically associated with an access mode that determines the type and scope of access granted to the process. The following are examples of access modes that can be employed with an embodiment of the present invention:

Null Mode ("NL mode"):

Holding a lock at this level does not convey any access rights. Typically, a lock is held at this level to indicate that a process is interested in a resource or that a process intends to later convert to an access mode that does grant access rights. A lock granted with this access mode can also be considered an "intent" mode lock.

Concurrent Read Mode ("CR mode"):

When a lock is held at this level, the associated resource is read in an unprotected fashion by the holding process. Other processes can both read and write to the associated resource while it is held in concurrent read mode.

Concurrent Write Mode ("CW mode"):

When a lock is held at this level, the associated resource is read or written in an unprotected fashion by the holding process. Other processes can both read and write to the resource while it is held in concurrent write mode.

Protected Read Mode ("PR mode"):

This mode can also be referred to as the "shared" mode. When a lock is held at this level, no process can write the associated resource. However, multiple other processes can concurrently perform reads upon the same resource.

Protected Write Mode ("PW mode"):

This mode can also be referred to as the "update" mode. Only one process at a time can hold a lock at this level. This access mode permits a process to modify a resource without allowing any other processes to modify the resource at the same time. However, this mode allows other processes to concurrently perform unprotected reads.

Exclusive Mode ("EX mode"):

When a lock is held at this level, it grants exclusive access to the resource to the holding process. No other process may read or write to the resource.

In an embodiment, a hierarchy of locks can be structured based upon these access modes. Generally, locks held at higher levels of the lock hierarchy have greater access rights than locks held at lower levels. In an embodiment, the NL mode lock is at the lowest level of the hierarchy. The CR mode lock is at the next level of the lock hierarchy. The CW and PR mode locks are both at the next highest level of the hierarchy. The next highest level of the lock hierarchy is the PW mode lock. The highest level of the lock hierarchy in the present example is the EX mode lock.

Multiple processes are normally allowed to concurrently access the same resource if the scope of the requested access modes are compatible with each other. Thus, a lock request for a particular access mode to a resource may be immediately granted if it is compatible with the access modes of locks that have already been granted. However, a lock request that is incompatible with one or more already granted lock modes is blocked or queued until the prior incompatible lock(s) are released.

This principle similarly applies to lock conversions. Lock conversions are changes in state from one access mode to another, and are initiated by a process in order to change its access rights to the resource. As with a new lock request, if the requested conversion mode is incompatible with already granted lock modes, then the lock conversion will be blocked or queued until the prior incompatible lock(s) are released. On the other hand, if the requested conversion mode is compatible with the granted lock modes, then the lock conversion may be immediately granted.

For each of the access modes described above, Table I indicates, for an embodiment of the invention, the type of accesses that can be obtained on a resource given the access modes that are already being held by other processes on a resource.

TABLE I

| Mode of Requested Lock | Mode of Currently Granted Lock | | | | | |
| --- | --- | --- | --- | --- | --- | --- |
| | NL | CR | CW | PR | PW | EX |
| NL | Grant | Grant | Grant | Grant | Grant | Grant |
| CR | Grant | Grant | Grant | Grant | Grant | Queue |
| CW | Grant | Grant | Grant | Queue | Queue | Queue |
| PR | Grant | Grant | Queue | Grant | Queue | Queue |
| PW | Grant | Grant | Queue | Queue | Queue | Queue |
| EX | Grant | Queue | Queue | Queue | Queue | Queue |

To illustrate the application of Table 1, consider a shared resource that is currently being locked by Process 1 in PR mode. If Process 2 requests a PR mode lock on the same resource, then the lock request can be immediately granted, since the modes of the requested lock and the granted lock are compatible. However, if Process 2 requests an EX mode lock on the resource, then the lock request is blocked or queued until Process 1 releases its lock or converts to a lock mode that is compatible with the requested lock mode.

RESOURCE OBJECT

Figure 3:
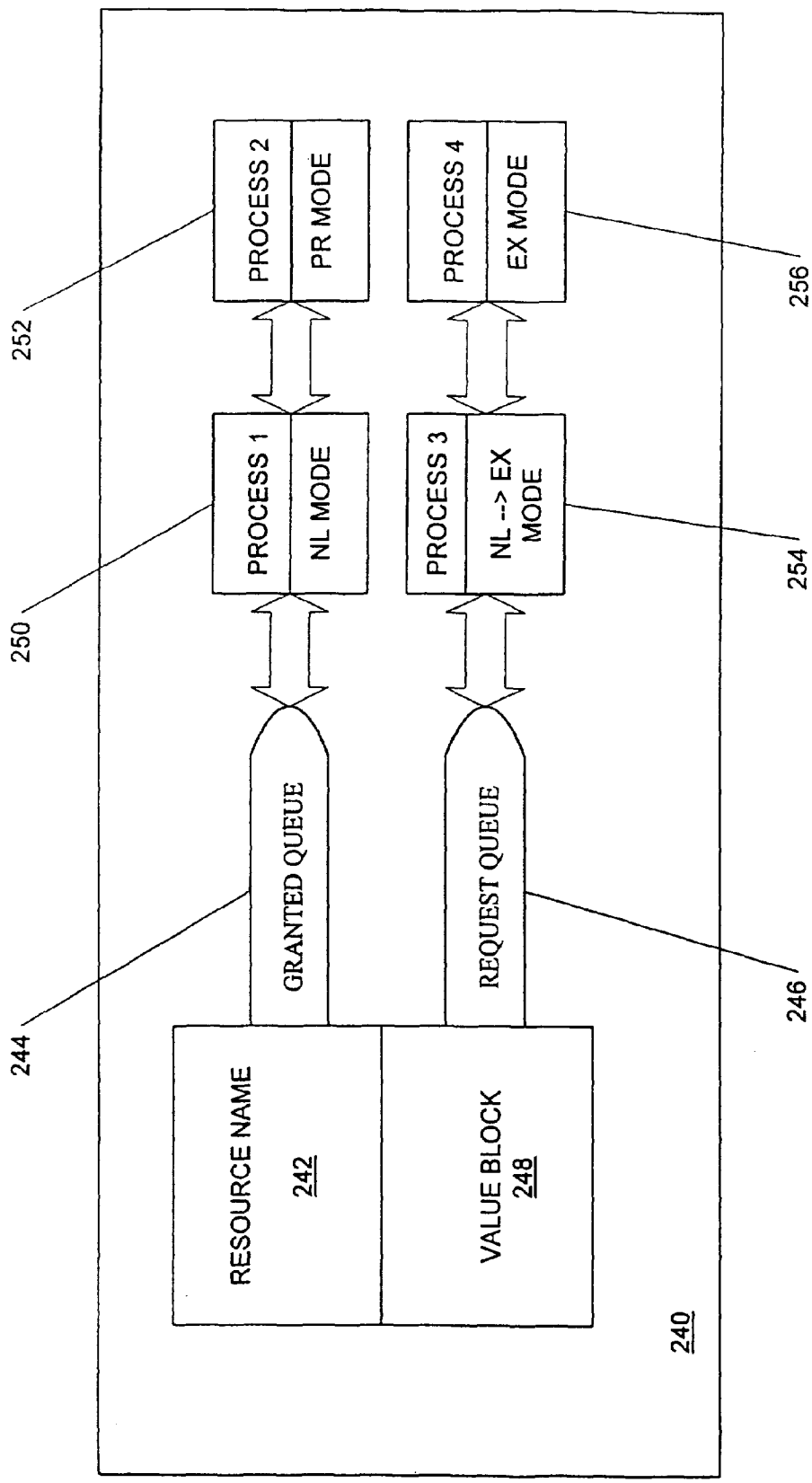
FIG. 3 illustrates a resource object according to an embodiment of the invention.

A "resource object," which can also be referred to as a "lock object," is maintained for each system resource whose access is being managed by the lock manager. FIG. 3 illustrates a resource object 240 according an embodiment of the invention. Each shared resource in the system locked by one or more processes corresponds to a resource object 240. Each resource object 240 is associated with a resource name 242. Each resource object 240 comprises a granted queue 244, a request queue 246, and a value block 248.

Granted queue 244 comprises a queue of locks granted on the associated named resource. When a lock is granted to a process, the granted lock is placed on the granted queue 244. In one embodiment, granted queue 244 comprises a doubly linked list of granted lock(s), wherein each granted lock comprises a structure indicating at least the identity of the calling process and the access mode granted to that process. In the example shown in FIG. 3, granted queue 244 contains two granted locks 250 and 252. Granted lock 250 is held by Process 1 in NL mode and granted lock 252 is held by Process 2 in PR mode.

Request queue 246 comprises a queue of lock requests for the associated named resource. If a lock request or lock conversion request conflicts with prior granted locks, then the requested lock is placed onto the request queue 246 until it can be granted. When the requested lock is granted, the lock request is removed from the request queue 246 and linked onto the granted queue 244. In an embodiment of the invention, request queue 246 comprises a doubly linked list of lock request(s), wherein each lock request structure indicates at least the identity of the calling process and the access mode requested by that process. In the example shown in FIG. 3, request queue 246 contains two lock requests 254 and 256. Lock request 254 was initiated by Process 3, and is a request for lock conversion from NL mode to EX mode. Lock request 256 was initiated by Processes 4, and is a request for a lock in EX mode. Lock requests 254 and 256 are queued onto request queue 246, since each request is incompatible with prior granted locks 250 and 252.

According to an embodiment of the present invention, each resource object 240 is associated with a value block 248, which is an allocation of memory that can be used to store information about the associated resource or resource object 240. It will be clear to one skilled in the art that value block 248 may comprise an arbitrary quantity of memory without affecting the scope of the present invention, and is not necessarily limited to the size of a single disk block. In an embodiment of the invention, the size of the value block 248 is set at 16 bytes. Alternatively, the size of value block 248 can be dynamically configured, and is set at the time the associated resource object 240 is created.

In an embodiment, value block 248 can be read or written to by processes whenever a lock request or lock conversion request is made on the associated resource. In an alternate embodiment, value block 248 can only be written to by a process that holds the resource in PW or EX mode, and only if the process is converting the lock to the same or lower mode on the lock hierarchy; however, in this alternate embodiment the value block 248 can still be read by any calling process.

PERSISTENT RESOURCE OBJECTS

The resource objects of the present invention can be persistent, and thus provide finer granularity locking by allowing shared resource objects to be dynamically allocated and de-allocated. According to the present invention, the lock manager initializes a resource object when the first lock is opened on a resource name. Each resource object is normally maintained in memory until the last lock is released upon that resource name. When the last lock is released, the resource object can be de-allocated, freeing the system overhead and memory tied up by the resource object. In this manner, fine granularity locks can be dynamically created to cover minute portions of the shared system resources for some duration, without excessively incurring system overhead and memory. Thus, locks can be created at granularities fine enough to cover one or more individual blocks of memory, or even smaller units of the system resources.

The resource object is not immediately released, however, even if all locks have been released on the associated resource, if the lock release was caused by an abnormal event which creates the possibility of inconsistent data on the system. Instead of being immediately released, the associated resource object is marked to indicate that it is in a "dubious" state, and persists until the appropriate corrective or validation steps are taken. An example of such an abnormal event is the death of a process while the process was holding an EX or PW mode lock on a resource. If this abnormal event occurs, there is a possibility that the process had made uncommitted modifications to the resource prior to its death, which could affect the integrity of the system data.

In one embodiment, to mark a resource object dubious, information is written to the value block associated for the resource object to indicate the dubious state of the resource. When a later process seeks to open a lock on the resource, it will first read the contents of the resource value block. If the value block is marked dubious, then the process is made aware that the resource may be in an inconsistent state and can take any actions deemed appropriate. In an embodiment, the client is able to inquire whether a particular resource is in a valid or dubious state without holding or requesting a lock on that resource. This is facilitated by having a value block that can be read by any calling process.

When a process abnormally terminates, the lock manager cleans up after the dead process by setting a persistent resource object in a dubious state if the dead process held a lock in an access mode in which there is a possibility of data invalidity. In an embodiment, the resource object is marked dubious if the process held the lock in PW or EX mode at the time of the process' death.

When an entire node abnormally terminates, there may be numerous resource objects that are placed in an inconsistent state, and the goal is again to identify and mark resources in which there is a possibility of data invalidity. In an embodiment, resource objects known to be locked in CW, PR, PW or EX modes by currently living processes on other nodes are not marked dubious since no process would have died holding the resource in EX or PW modes. Other resources may be known to be valid due to lock manager design, and not by the existence of good locks. For example, the lock manager mechanism may be aware of the state of all locks formerly mastered on the surviving nodes if the master node for the resource objects is designed to hold information about all locks from all nodes on that resource. This information may be enough to determine whether or not the resource object is valid. In an embodiment, all resource objects not known to be valid either by the existence of valid locks or by survival of the master node for that resource are marked dubious.

After the failure of a node, a more difficult recovery scenario is presented because of the distributed nature of the lock manager, since some information on the state of the lock manager may have been maintained only on the failed node and may not retrievable or recoverable. In an embodiment, upon node failure the lock manager collects as much information as possible to recreate much of the state of the locks and resources on the system. The lock manager identifies all locks it knows about which may have had master resource information on the dead node. These would normally include all resources which had locks granted to processes on surviving nodes. For these locks, it may also be necessary to determine whether the associated resource object has a dubious value and mark it accordingly. Since some information may have been lost, it may not possible to know for certain whether some resources had locks held on the dead node in protected write or exclusive mode; in an embodiment, those resources are also marked dubious. In an embodiment, other resources having locks held by processes on surviving nodes in PR, PW, or EX mode are not marked dubious. Also, the lock manager should clean out all locks owned by processes on the dead node, which may result in the grant of locks off the request queues now possible due to the closing of inconsistent locks on the grant queue. In addition, the lock manager may choose to perform lock manager node reconfiguration (to redistribute resource objects among the surviving nodes).

Figure 4:
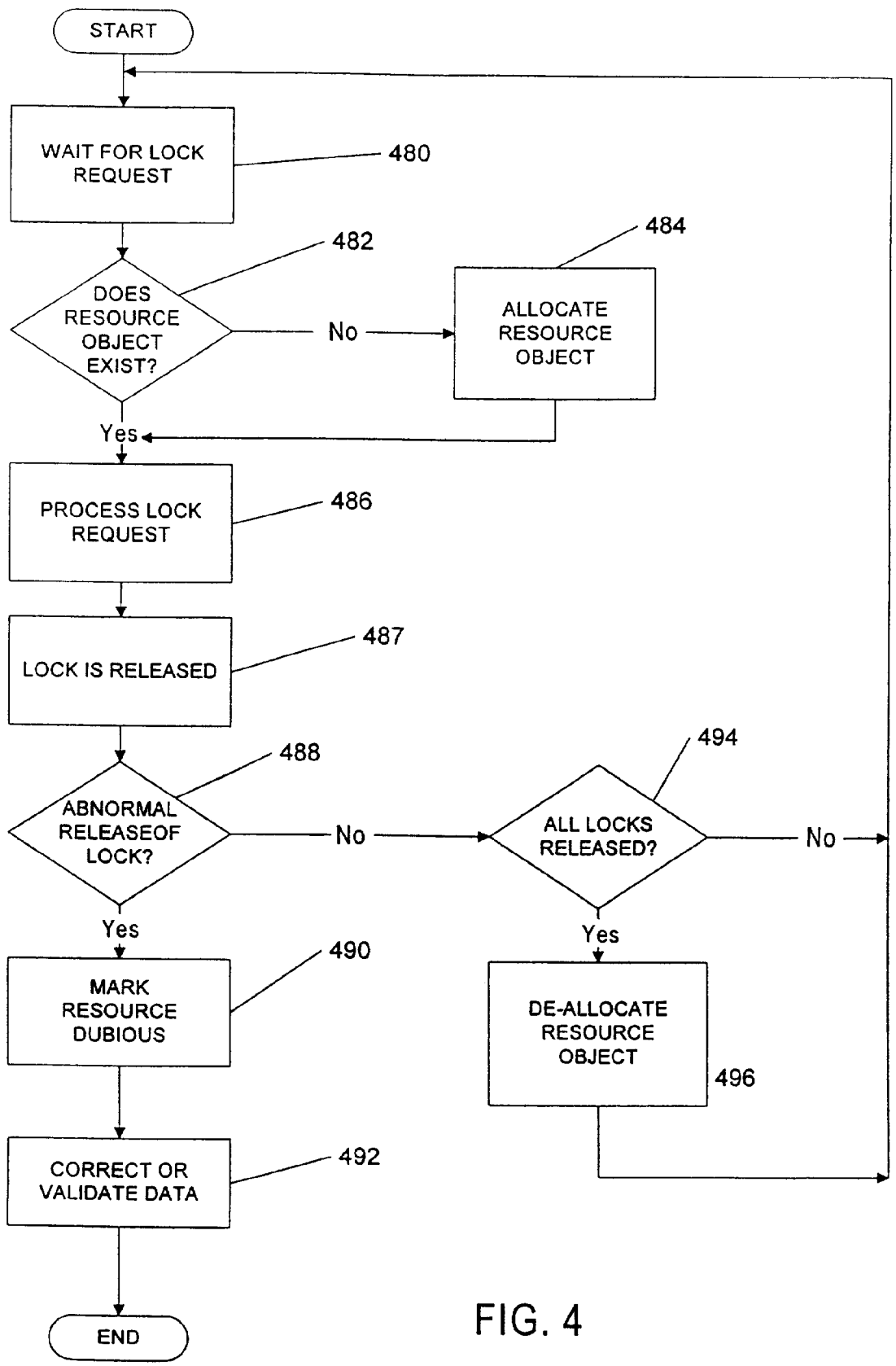
FIG. 4 is a flow diagram illustrating a locking routine with persistent resource objects according to an embodiment of the invention.

FIG. 4 is a flow diagram illustrating a locking process with persistent resource objects according to an embodiment of the invention. At step 480, a lock manager instance waits for incoming lock requests or lock conversion requests for a named resource.

If a lock request or a conversion request is received, then at step 482 the lock manager tests whether an existing resource object has been opened for the requested resource. If an open resource object already exists for the requested resource, then control passes directly to step 486. If an open resource object does not exist for the requested resource, then at step 484, a new resource object is dynamically allocated.

The lock request or lock conversion request is processed by the lock manager at step 486. If the requested lock mode or lock conversion mode is compatible with already granted locks, then the requested lock or conversion request is immediately granted, and the granted lock is linked onto the granted queue. If the requested lock mode or lock conversion mode conflicts with already granted lock mode(s), the lock request is placed on the request queue.

At step 487, a granted lock is released. At step 488, a test is performed to determine whether the lock was released under abnormal circumstances indicating the possibility of data integrity problems. If not, then at step 494 a determination is made whether there are any other locks being held on the resource. If there are no locks being held on the resource, then the resource object is de-allocated at step 496. Otherwise, control returns back to step 480, where the lock manager awaits further lock requests.

If at step 488 it was determined that there are possible data integrity problems, e.g., because of abnormal node or process death, then at step 490 the resource object is marked dubious. At step 492, the system takes actions to correct or validate the integrity of whatever object the lock was protecting, to guard against the possibility of data corruption. In an embodiment, step 492 comprises the recovery and/or restoration of the affected resource back to a state prior to any modification made by the deceased process, using well-known techniques to perform recovery/ restoration of database information from system logs, e.g., redo and undo logs. In an embodiment, the corrective action initiates when another process seeks to obtain a lock on the resource, but determines that the resource is in a dubious state.

In an embodiment of the invention, both persistent and non-persistent resource objects may be concurrently utilized by the lock manager. Depending upon the requirements of the system, some of the system resource objects are persistent, as described above. Other resource objects are not persistent, and will automatically terminate when all locks are released, regardless of the circumstances of the lock release. An alternate embodiment comprises a system whereby only persistent objects are utilized by the lock manager when a process seeks a lock on a resource.

LOCK MANAGER GROUPS

According to an embodiment of the invention, a lock manager "group" is a coupling of related processes. Any process may create a lock manager group and other processes may attach to that group. Any group-owned lock can be manipulated by any process that is a member of that group. Locks created by a process which is attached to a lock manager group can be considered group-owned locks. Groups may be able to span nodes of a system. In an embodiment, the lock manager may impose the restriction that all members of one group must belong to the same node. In an embodiment, a group, once created, will continue to exist until all processes detach from the group, either explicitly or implicitly, e.g., by the process exiting. The group can be created such that the group will terminate if the creating process terminates or detaches explicitly from the group.

It is possible for persistent resource objects to have locks owned by groups instead of processes. In an embodiment, group-locked resource objects are not marked dubious after a process death. Instead, the resource object will be marked dubious only if the entire group terminates, which occurs, for example, as a result of numerous process deaths or a node death. In general, group-locked persistent resource objects operate similarly to process-locked persistent resource objects, but the behavior normally initiated by a process death for a process-locked object is instead triggered by a group death with respect to a group-locked object.

One danger of the group-owned lock is that a process dies without notifying other processes in the group of the existence of a group-owned lock. If the process fails to pass a handle to the lock to the group, the group may not be able to release the lock, even if the group knows that the lock exists. To address this, the acquiring process may write the lock handle into memory shared by the group. Alternatively, the lock manager may be responsible for writing the lock handle to the group's shared memory. Another embodiment comprises a pre-allocation scheme, where the lock manager maintains at least one pre-allocated lock handle that would either be the next handle to be granted to a process, or would be a placeholder for the next handle for the process. In the event of process death, the lock manager would know that a pre-allocated lock handle could be cleaned up regardless of whether the client process received notification of the lock grant.

RECOVERY DOMAINS

In an embodiment of the invention, persistent resource objects are grouped into one or more recovery domains. Each recovery domain comprises a group of persistent resource objects from one or more nodes in the distributed system. Recovery domains allow the lock manager to identify and clean up multiple dubious resource objects as a group. In an embodiment, all nodes accessing the same database may belong to the same recovery domain.

Each recovery domain maintains a recovery list (also referred to as a "register queue") of dubious resource objects associated with that domain. For a process or group death, the lock manager marks each affected persistent resource object as dubious, and adds that resource object to the recovery list for its associated resource domain.

For a node death, the affected recovery domain is placed in a dubious state. The dubious status of the recovery domain is broadcast to all nodes that are affected by the recovery domain. As part of node reconfiguration (i.e., to reallocate locks among the surviving nodes), the lock manager identifies all resource objects that is known to exist. Existing persistent resource objects locked in CW mode or higher by living processes are considered valid. Other resource objects that were mastered on surviving nodes are also known to be valid. All other persistent resource objects are marked dubious, and are added to the recovery list for the affected recovery domain. If the recovery domain is in a dubious state, then any locks granted to new persistent resource objects allocated in that recovery domain will immediately be marked dubious.

In one embodiment, each lock manager instance on the distributed nodes maintains one or more of the following data objects in shared memory: domain name, domain state, recovery status, register queue, validate queue, save queue, and reference count.

The domain name object records the identity of the recovery domain for that node. The domain state object indicates whether the recovery domain is in a "dubious" or "valid" state. The recovery status object indicates: (1) whether recovery has been initiated; (2) whether recovery has been initiated and there has been no node death since then; or, (3) whether there has been a node death since the latest recovery operation.

The register queue maintains a list of persistent resource objects that are marked dubious and are to be validated after the next recovery. The validate queue is a list of persistent resource objects in the local lock manager instance recovered during the preceding recovery operation which are ready to be validated. The resource objects in the validate queue will be validated when the entire recovery domain is validated. The save queue is a list of persistent resource objects known to be valid and that can be closed cleanly, even though the domain state is dubious. Persistent resource objects known to be valid will not be immediately de-allocated when they are cleanly closed. Instead, they are marked and added to the save queue, so that if these resources are later opened while the domain state is still dubious, then they will be known to be valid rather than dubious. The resource objects in the save queue will close when the recovery domain is validated.

The reference count is the number of local processes currently attached to the recovery domain in the local lock manager instance. When a process attaches to a recovery domain, the reference count of the recovery domain is incremented. If the recovery domain does not yet exist in the local lock manager instance (e.g., because no live processes are attached to it), the recovery domain data objects will be created. A request for the creation of recovery domain data objects will be broadcast to all other lock manager instances. When a process detaches from a recovery domain, the reference count is decremented. When there are no more processes attached to a recovery domain, all persistent resources in that recovery domain may be cleaned up and de-allocated. The recovery domain data objects can thereafter be cleaned up and released in all lock manager instances.

Figure 5A:
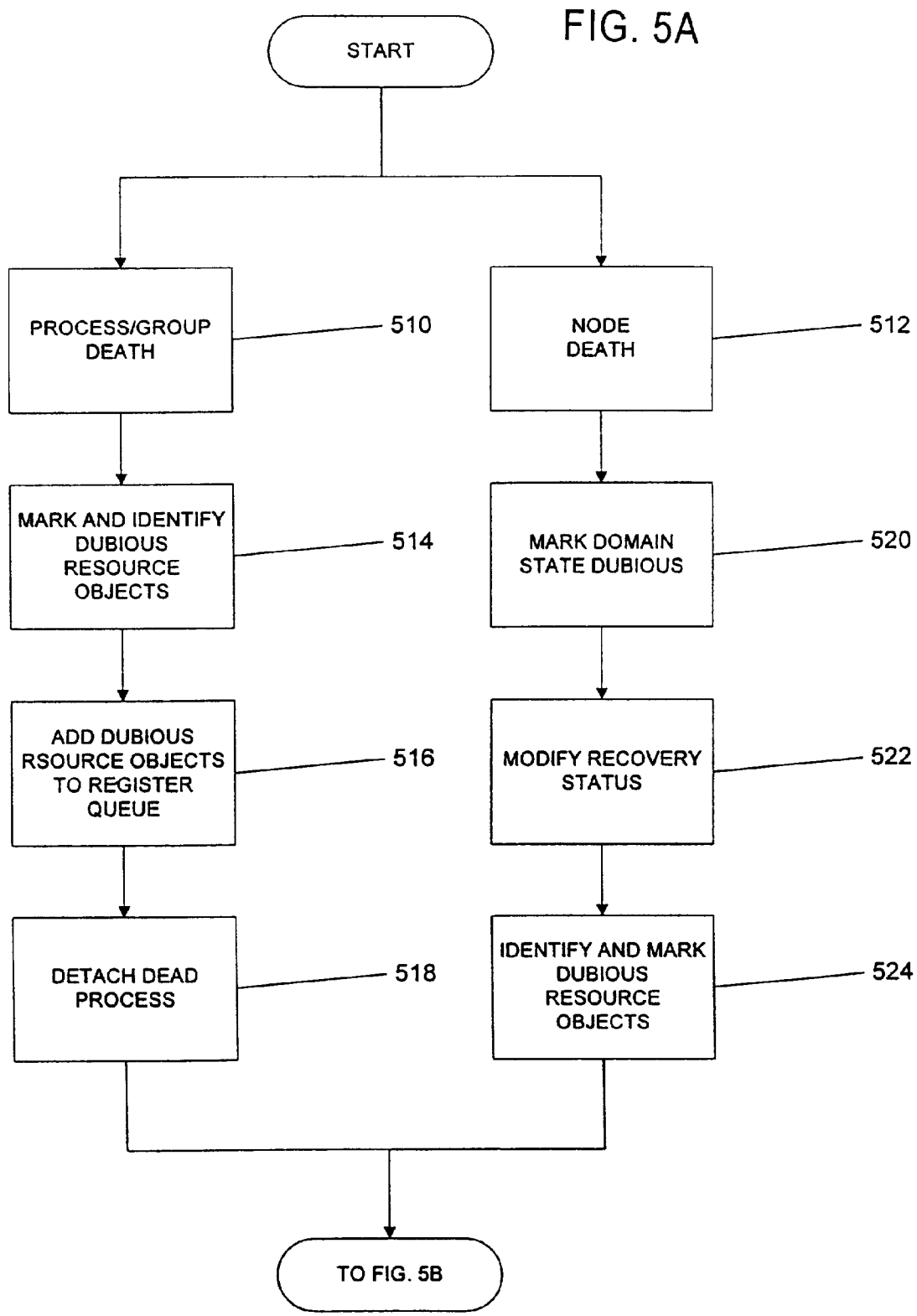
FIGS. 5A and 5B illustrate flow diagrams of a recovery routine with recovery domains according to an embodiment of the invention.
Figure 5B:
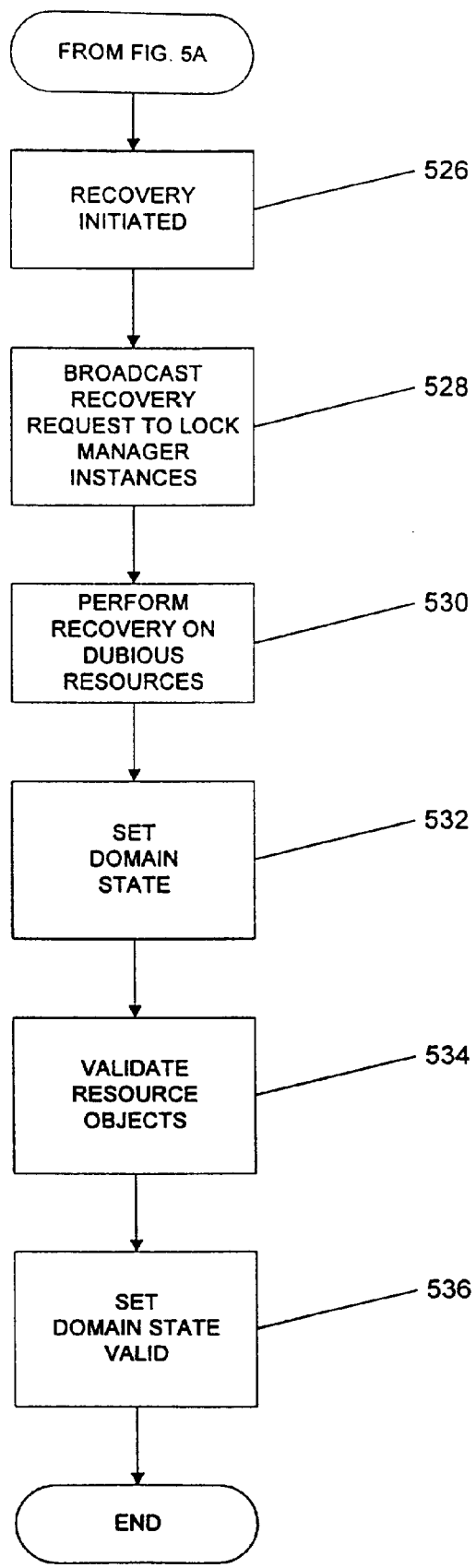

FIGS. 5A and 5B illustrate flow diagrams of a recovery routine with recovery domains according to an embodiment of the invention. The process of FIG. 5A may be initiated by either a process/group death at step 510 or a node death at 512.

For a process/group death recovery, a lock manager instance will, at step 514, identify all resources for which there is a possibility of data integrity problems, and mark the associated persistent resource objects as dubious. In an embodiment, all persistent resource locked in PW or EX mode by owner processes that exit abnormally are marked dubious. At step 516, each dubious resource object is added to the recovery list/register queue. At step 518, each dead process detaches from the recovery domain and the reference count decrements accordingly.

For a node death, at step 520, the domain state of each affected recovery domain is marked dubious. At step 522, the recovery status of the recovery domain changes to indicate that there has been a node death, and the timestamp object increments. At step 524, the lock manager identifies and marks all resource objects that it believes to be dubious, and adds these resource objects to the recovery list/register queue. As long as the domain state remains dubious, all newly allocated persistent resource objects in that recovery domain are marked as dubious.

Referring to FIG. 5B, recovery initiates at step 526. In an embodiment of this invention, recovery starts when a client process calls for domains recovery. This may occur, for example, when a process attempts to open a lock on dubious resource object. Before the process obtains a lock on that resource object, it initiates recovery to validate the integrity of the resource.

At step 528, the local lock manager instance broadcasts the recovery request to all other interested lock manager instances. At step 530, the resource objects on the register queue at each node are recovered, and the recovered resource objects are moved to the validate queue. The domain state of the recovery domain is set at step 532 to indicate that recovery has been started. At step 534, the system validates and de-queues the resource objects on the validate queue. At step 536, the domain state is set to a valid state.

Although the invention has been described in detail with particular reference to the preferred embodiments as illustrated and described herein, as would be obvious to those skilled in the art after a review of the drawings and specification, various modifications may be made which are encompassed by the present invention, and the scope of the invention is not to be restricted except within the scope and spirit of the appended claims.

What is claimed is:

1. A method for locking resources in a computer system comprising the steps of:
   opening a resource object for a resource in said computer system;
   granting one or more locks to said resource object;
   automatically de-allocating said resource object in response to said locks being released only if said locks are validly released from said resource object;
   marking said resource object if one or more of said locks are released from said resource object with the possibility of data integrity problems; and
   when said resource object is marked, preventing said resource object from being de-allocated in response to said locks being released.

2. The method of claim 1 wherein said marking step further comprises the step of marking said resource object with a dubious state.

3. The method of claim 1 wherein said resource object is marked if a process holding one of said locks abnormally dies.

4. The method of claim 3 wherein said process is holding an exclusive lock on said resource object.

5. The method of claim 3 wherein said process is holding a protected write lock on said resource object.

6. The method of claim 1 wherein said locks are not validly released because of a node death.

7. The method of claim 1 wherein said resource object is one of a plurality of resource objects in said computer system the method further comprising the step of recovering each of said resource objects that have been marked.

8. The method of claim 1 further comprising the steps of:
   opening a second resource object for a second resource in the computer system;
   granting one or more locks to the second resource object; and
   not automatically de-allocating the second resource object in response to the locks being released even if the locks are validly released from the second resource object.

9. The method of claim 1 wherein each lock is owned by a single process.

10. The method of claim 1 wherein at least one lock is owned by a lock manager group that comprises multiple processes.

11. The method of claim 10 wherein processes belonging to the lock manager group manipulate the locks owned by the lock manager group.

12. The method of claim 10 wherein the lock manager group spans more than one node of the computer system.

13. The method of claim 10 wherein:
   the lock manager group terminates when the process that created the lock manager group detaches from the lock manager group;
   the lock manager group terminates when the process that created the lock manager group terminates; and
   the resource objects associated with locks owned by the lock manager group are marked dubious only if the processes that belong to the lock manager group terminate.

14. The method of claim 10 wherein a handle to each lock owned by the lock manager group is written into a shared memory of the processes that belong to the lock manager group.

15. A lock manager for controlling and managing the access of system resources on a computer system comprising:
   a lock object, said lock object comprising at least one queue and a value block;
   said at least one queue comprising granted locks and lock requests; and
   said value block configured to be marked dubious if one or more of said granted locks are released with the possibility of data integrity problems.

16. The lock manager of claim 15 wherein said lock object is marked dubious if a process holding one of said granted locks abnormally dies.

17. The lock manager of claim 16 wherein said process is holding an exclusive lock on said lock object.

18. The lock manager of claim 16 wherein said process is holding a protected write lock on said lock object.

19. The lock manager of claim 16 wherein said lock object is marked dubious if a network node abnormally dies.

20. The lock manager of claim 15 wherein the lock manager is configured to maintain a first set of resource objects and a second set of resource objects wherein each resource object in the first set of resource objects is automatically de-allocated in response to all the locks of the resource object in the first set of resource objects being validly released and wherein each resource object in the second set of resource objects is not automatically de-allocated in response to all the locks of the resource object in the second set of resource objects being validly released.

21. The lock manager of claim 15 wherein the lock object is one of a plurality of lock objects in the computer system, and wherein the lock manager is configured to recover each of the lock objects that has been marked.

22. The lock manager of claim 15 wherein each lock is owned by a single process.

23. The lock manager of claim 15 wherein at least one lock is owned by a lock manager group that comprises multiple processes.

24. The lock manager of claim 23 wherein processes belonging to the lock manager group manipulate the locks owned by the lock manager group.

25. The lock manager of claim 23 wherein the lock manager group spans more than one node of the computer system.

26. The lock manager of claim 23 wherein:

the lock manager group terminates when the process that created the lock manager group detaches from the lock manager group;

the lock manager group terminates when the process that created the lock manager group terminates; and the resource objects associated with locks owned by the lock manager group are marked dubious only if the processes that belong to the lock manager group terminate.

27. The lock manager of claim 23 wherein a handle to each lock owned by the lock manager group is written into a shared memory of the processes that belong to the lock manager group.

28. A computer readable medium carrying one or more sequences of instructions for locking resource in a computer system, wherein execution of the one or more sequences of instructions by one or more processors causes the one or more processors to perform the steps of:

opening a resource object for a resource in a computer system;

granting one or more locks to said resource object;

automatically de-allocating said resource object in response to said locks being released only if said locks are validly released from said resource object;

marking said resource object if one or more of said locks are released from said resource object with the possibility of data integrity problems; and when said resource object is marked, preventing said resource object from being de-allocated in response to said locks being released.

29. The computer readable medium of claim 28 wherein the marking step further comprises the step of marking the resource object with a dubious state.

30. The computer readable medium of claim 28 wherein the resource object is marked if a process holding one of the locks abnormally dies.

31. The computer readable medium of claim 30 wherein the process is holding an exclusive lock on the resource object.

32. The computer readable medium of claim 30 wherein the process is holding a protected write lock on the resource object.

33. The computer readable medium of claim 28 wherein the locks are not validly released because of a node death.

34. The computer readable medium of claim 28 wherein said resource object is one of a plurality of resource objects in said computer system, the method further comprising the step of recovering each of said resource objects that have been marked.

35. The computer readable medium of claim 28 further comprising the steps of:

opening a second resource object for a second resource in the computer system;

granting one or more locks to the second resource object; and not automatically de-allocating the second resource object in response to the locks being released even if the locks are validly released from the second resource object.

36. The computer readable medium of claim 28 wherein each lock is owned by a single process.

37. The computer readable medium of claim 28 wherein at least one lock is owned by a lock manager group that comprises multiple processes.

38. The computer readable medium of claim 37 wherein processes belonging to the lock manager group manipulate the locks owned by the lock manager group.

39. The computer readable medium of claim 37 wherein the lock manager group spans more than one node of the computer system.

40. The computer readable medium of claim 37 wherein:

the lock manager group terminates when the process that created the lock manager group detaches from the lock manager group;

the lock manager group terminates when the process that created the lock manager group terminates; and the resource objects associated with locks owned by the lock manager group are marked dubious only if the processes that belong to the lock manager group terminate.

41. The computer readable medium of claim 37 wherein a handle to each lock owned by the lock manager group is written into a shared memory of the processes that belong to the lock manager group.

* * * * *